No. 615,494. Patented Dec. 6, 1898.
F. H. RICHARDS.
WEIGHING MACHINE.
(Application filed Jan. 7, 1898.)

(No Model.) 5 Sheets—Sheet 1.

Fig.1.

Witnesses: Inventor:
O.W.Smith F.H.Richards
Fred.J.Dole

No. 615,494. Patented Dec. 6, 1898.
F. H. RICHARDS.
WEIGHING MACHINE.
(Application filed Jan. 7, 1898.)

(No Model.) 5 Sheets—Sheet 2.

Fig. 2.

Witnesses:
O. W. Smith
Fred. J. Dole.

Inventor:
F. H. Richards

No. 615,494. Patented Dec. 6, 1898.
F. H. RICHARDS.
WEIGHING MACHINE.
(Application filed Jan. 7, 1898.)
(No Model.) 5 Sheets—Sheet 4.

Fig. 4.

Witnesses:
O. W. Smith
Fred. J. Dole.

Inventor:
F. H. Richards.

No. 615,494.  
F. H. RICHARDS.  
WEIGHING MACHINE.  
(Application filed Jan. 7, 1898.)

Patented Dec. 6, 1898.

(No Model.)  
5 Sheets—Sheet 5.

Witnesses:
O. W. Smith
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 615,494, dated December 6, 1898.

Application filed January 7, 1898. Serial No. 665,900. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and it has for its main object the provision of an improved automatic electrically-controlled machine for weighing predetermined quantities of material in successive compartments or chambers of an intermittently-rotating load-receiver and in which the rising and falling movements of the rotating receiver and the intermittent partial rotations thereof will serve to control the several main parts of the weighing-machine, by means of which the loading and the discharging of the individual compartments are controlled.

As to one of the main features thereof this invention has for its object to provide an improved load-receiver of the "rotary" type in which adjacent compartments of the multichamber-receiver will be separated from each other by one or more shiftable partitions or walls, preferably oscillatory independently of each other. One of these partitions constitutes the main dividing-wall and may face toward the periphery of the rotative receiver, so as to swing about a point at that end thereof which is nearest to the axis of said receiver. Preferably the main shiftable partitions will be supported on fixed walls, which may reach from the axis of the receiver, and hence said shiftable members will not constitute in this case complete side walls for the several compartments, but only partial side walls, by reason of which construction it will be apparent that the major portion of a load when made up in any compartment of the receiver need not bear against or exert any considerable pressure upon this shiftable member or partition, and hence the latter may be shifted or oscillated freely even when the load is practically completely made up. It will be seen that such a shiftable member may be employed, if properly positioned, as a stream-deflector coöperative with the controlling means of the weighing mechanism for diverting the flow of the stream away from one compartment when the latter is filled and into another chamber of the rotary receiver. Such a stream-deflector constitutes an important feature of this invention, and in the construction illustrated herein it will be supported between adjacent chambers, so as to be swung across and intersect the path of the flow of the stream issuing from a suitable source of supply when the weighing mechanism descends to a point corresponding substantially to the overpoised position thereof.

In connection with the stream-deflector— and it should be understood, of course, that in a multichamber load-receiver of the type hereinbefore referred to one such stream-deflector will be employed for each compartment of the bucket—suitable actuating means will be employed for positively operating the stream-deflecting partition at the proper point in the descent of the receiver. Moreover, these actuating devices will be controlled, preferably electrically, by the movement of one or more parts of the weighing mechanism on the arrival of these parts at the proper points in their movements.

In this case the actuation of each stream-deflector will be dependent upon the proper positioning of the load-receiver in circumferential direction—that is to say, to the stoppage of the receiver at the proper point in its rotation—and to the descent of the weighing mechanism as a whole to a point corresponding to the full-load position of the weighing mechanism. Owing to this fact it will be apparent that when the parts are controlled electrically the circuits to each actuator for the stream-deflector will have therein at least two breaks governed by a pair of circuit-controlling devices controlled, respectively, by the rotation of the load-receiver and by the descent of the weighing mechanism to the proper point.

It is intended in this case that the rotation of the load-receiver and the movements of the valve mechanism shall be controlled also electrically, and hence I have illustrated herein, in connection with electrical devices just described, suitable electrically-released holding means adapted for stopping the load-receiver at predetermined points in its rotation and for releasing the same and valve-actuating means, which may be controlled not only by the rotation of the load-receiver, but also by the descent of the same at the proper point or points during the making up of a load, by the movements of the stream-deflectors, hereinbefore referred to, and by suitable regulating apparatus, which will be described more particularly hereinafter.

In the preceding description I have stated that there are one or more partitions between the adjacent compartments of the multichamber load-receiver, and not only is this the case, but in the preferred construction each compartment of the load-receiver has shiftable or oscillatory partitions at opposite sides thereof, these partitions constituting when in their normal positions the opposite walls of one compartment of the receiver, as will be evident. Preferably one of these partitions will be a freely-swinging wall or plate movable between two extreme positions and so constructed and positioned as to close one side of the chamber when the latter is in a position to be filled, while capable of swinging out of the way and permitting the last portion of the supply-stream at the end of a loading operation to be deflected away from the filled chamber and into the next succeeding chamber in which the next load is to be made up. For this purpose each of these gravitative partitions is preferably supported for oscillation at a point adjacent to the periphery of the rotary load-receiver and facing toward the axis of the latter, while the stream-deflectors, as hereinbefore stated, are pivoted at points near such axis and face toward the periphery, the two sets of shiftable partitions therefore facing in opposite directions. Moreover, although the gravitative partitions may be swung freely between two extreme positions in accordance with the rotation of the receiver the stream-deflectors will be positively actuated, preferably by a spring-and-toggle connection governed by the rotation of the load-receiver and operative for shifting the stream-deflectors successively in one direction at one common point in the rotation of the receiver and for shifting them successively in the opposite direction at another common point in said rotary movement.

Other features of this invention which I deem of importance refer to the manner in which the valve mechanism is constructed and operated, to the interlocking of the movements of the valve, the intermittently-rotative load-receiver, and the regulator, and to an improved regulator apparatus, all of which parts will be described in detail hereinafter.

In the drawings accompanying and forming part of this specification.

Similar characters designate like parts in all the figures of the drawings.

Any suitable framework may be employed for supporting the several operative members of my improved machine. That illustrated herein comprises the usual hollow base 3, having side frames 2 and 2' rising therefrom and connected at their upper ends by a top beam 5, on which may be supported in the usual manner suitable stream-supplying means, such as an inclined hopper H.

The weighing mechanism proper will embody the usual beam mechanism, such as that indicated at B, supported in the customary manner by knife-edge bearings on forwardly-extending arms or brackets 6 and 6', forming parts of the uprights 2 and 2'. This beam mechanism will be counterweighted in the usual manner—as, for example, as indicated at W.

The load-receiver of the weighing mechanism proper will be in this instance a rotary one, and it may be mounted for rotation in any suitable manner at the forward end or poising side of the beam. The axis of the rotation of the receiver is indicated by 10. The receiver proper, which is designated in a general way by G, may be of any suitable construction as to the details thereof, but will embody a plurality or circuit of compartments (in this instance three in number) adapted to be filled successively while the receiver is prevented from rotating, it being obvious, of course, that said receiver will be rotated intermittently to bring successive chambers beneath the hopper H. The principal feature of this load-receiver, which distinguishes it from other rotary receivers, is the employment of shiftable partitions or dividing-walls between adjacent chambers, these partitions being preferably shiftable, as before stated, for different purposes, which will be manifest by referring to the drawings, but which will be described now in detail.

The three compartments of the load-receiver are designated by C, C', and C'', and all are substantially alike. In the present case the load-receiver is substantially in the form of a wheel having two preferably curvilinear side walls, such as 12 and 12', these side walls being connected in some suitable manner, so as to divide the wheel into the necessary number of compartments. In the construction shown a substantially spider-shaped casting having its center coincident with a point in the axis of the receiver G connects the side walls 12 and 12' and has three fixed partitions or walls, such as 15, 15', and 15", extending or radiating from such axis; but these fixed partitions or dividing-walls do not extend to the periphery of the rotary bucket or wheel. Instead they extend in the construction shown only about half-way to such periphery, and the space between the outer end of each fixed partition and such periphery is controlled by a shiftable partition or wall of the type hereinbefore mentioned. In this instance there are three shiftable partitions mounted for oscillation on the outer ends of the respective fixed walls and three other shiftable partitions mounted for oscillation on the side walls 12 and 12' at points adjacent to the periphery of the rotary bucket or wheel G. Each partition of the first set therefore faces outwardly, while each one of the latter set faces inwardly, the members of the respective sets being designated by 20, 20', and 20" and 21, 21', and 21".

As the construction and operation of the members or parts of each chamber of the compartment-wheel G, as well as the several actuating devices therefor and the circuit-controller, hereinafter to be referred to, disposed at different points on the bucket, are substantially similar in construction and operation, a description of one set of each of the three sets will be sufficient for all, appropriate prime-marks being applied to those corresponding parts not specially referred to herein.

The gravitative partition or dividing-wall 21 is intended to oscillate between two extreme positions defined the one by a stop 22 and the other by the inner or butt end 23" of the swinging partition 20".

Figure 1:
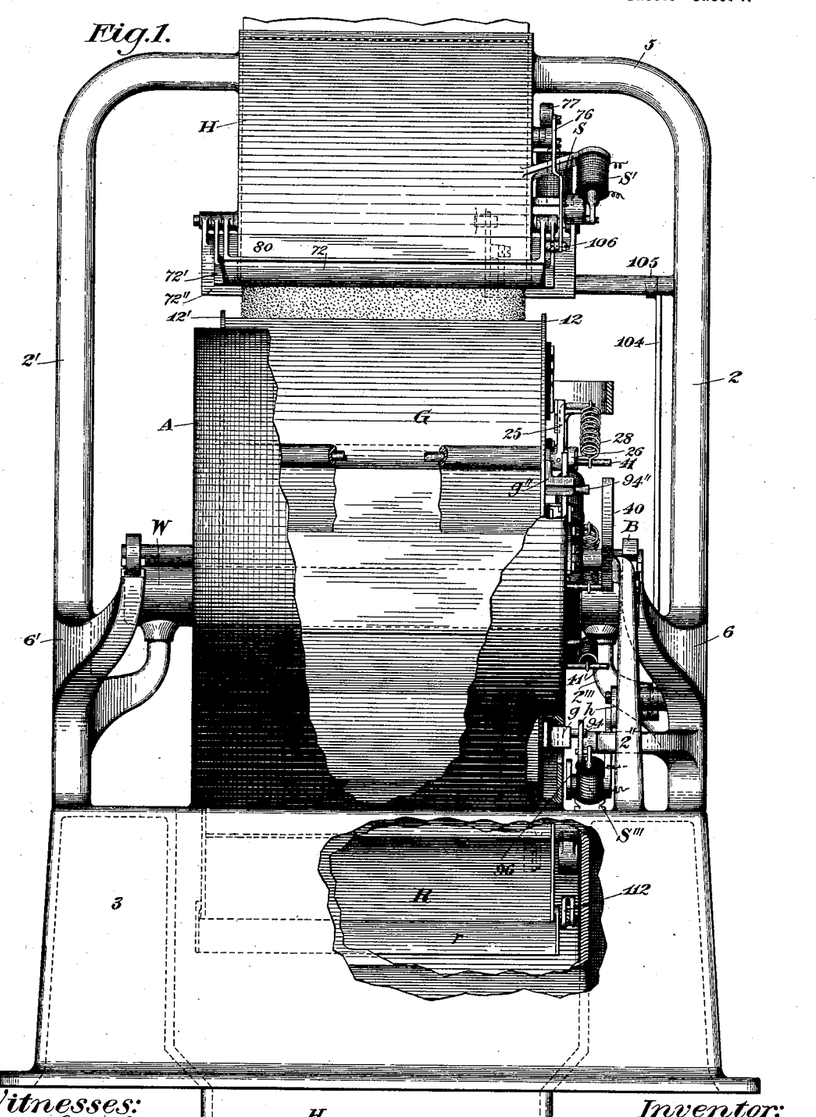
Figure 1 is a front elevation of an automatic weighing-machine constructed in accordance with my present improvements, parts being broken away to illustrate the construction more clearly.
Figure 2:
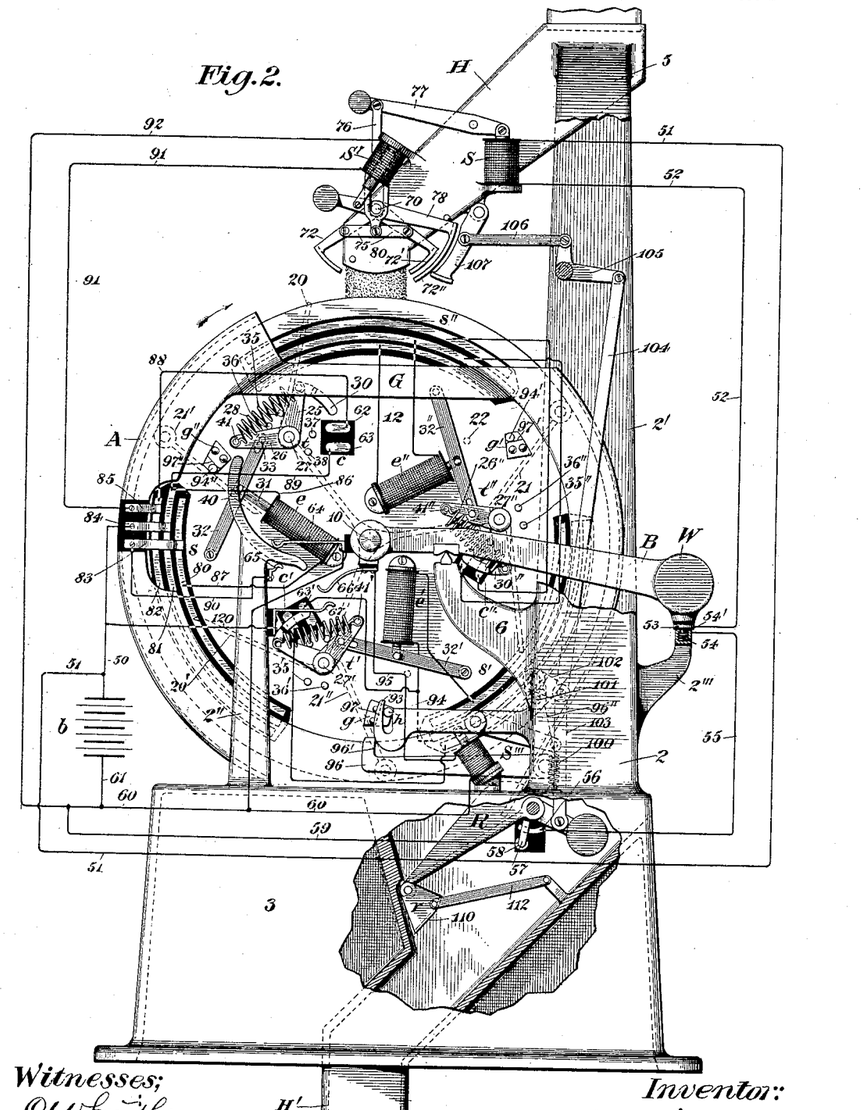
Fig. 2 is a side elevation of the same with parts removed and illustrates the positions of the parts at the beginning of the making up of a load in a chamber of the rotary load-receiver.
Figure 5:
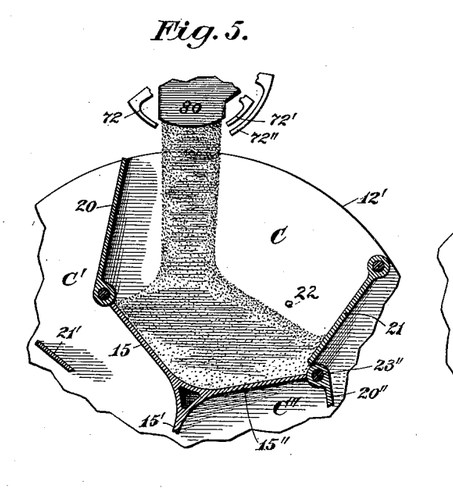
Figs. 5, 6, and 7 are details illustrating the positions of the valve mechanism with respect to the coöperative parts of the load-receiver during the flow-stream and the drip-stream periods and at the cut-off points, respectively.
Figure 6:
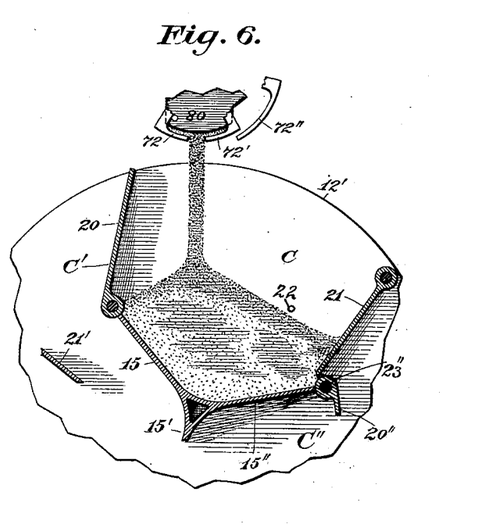
Figure 7:
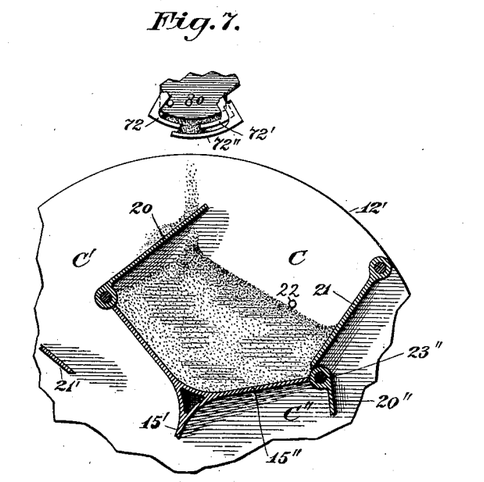

It will be noticed that when the partition 21 is in the position shown in Figs. 5, 6, and 7 its own weight will maintain the right-hand side of the compartment C closed, while when rotated to the proper point—as, for example, to the position indicated for the swinging partition 21', Fig. 2—one side of the chamber will be opened for a purpose to be stated.

The dividing-wall or partition 20 lies normally in the position shown in Figs. 5 and 6 and is held there by suitable devices until the load in the chamber C is substantially completed, when it will be swung to the position shown in Fig. 7 to cut off the supply of material to said chamber and to deflect the last part of the flow-stream into the chamber C.

The function of the gravitative partition will now be clear, as it will be seen, by referring particularly to Fig. 2, that when the partition 21' is in the position shown in said view the last part of the flow-stream will be deflected into the chamber C', as indicated in Fig. 7, and supported between the wall 15' and the oscillatory partition or stream-deflector 20', as seen in Fig. 2, the partition 21' of course falling by gravity into place and closing its wall of the chamber C' when the latter is brought into position to be filled on the rotation of the load-receiver.

The actuating means carried by the load-receiver for shifting the stream-deflectors successively to cut off the flow-stream from each compartment may be of any suitable type, but the construction illustrated in the drawings I deem desirable for the purpose.

In the views shown I have illustrated three sets of toggle devices for actuating said stream-deflectors, these toggle devices being indicated, respectively, by $t\ t'\ t''$, and three sets of electrical devices for operating each of said toggles in one direction, these electrical devices being designated by $e\ e'\ e''$. The actuating devices illustrated by $t$ comprises in this case a pair of toggle-arms 25 and 26, having their axes of movement coincident with that of the stream-deflector 20. The toggle-arm 25 is in the form of a rock-arm integral with the stream-deflector 20, while the toggle-arm 26 is a link mounted for oscillation on a pin 27, on which said stream-deflector is mounted. These two toggle-arms may be connected by means of a helical spring, such as 28, which of course will tend to strike the toggle whenever the arms of the latter are carried past the dead-center position in either direction. Hence it will be clear that when it is desired to actuate the toggle from one position to the other it is only necessary to shift the toggle-arm far enough to pass the dead-center line, whereupon the movement of the toggle members will be continued and completed by the spring.

Each of the stream-deflectors governs, as before stated, the movement of a circuit-controller governing the making and breaking of an electric circuit, controlling in this case the operation of a valve of the machine. That circuit-controller which is carried by the stream-deflector 20 is designated by 30 and is of course suitably insulated.

The electrical actuating device $e$ may be of any suitable type, but preferably is a solenoid, the core 31 of which is connected to a lever 32, mounted on the bucket and connected by means of a slip-joint with a pin 33 on the toggle-arm 26.

It will be clear that when the solenoid is energized the lever 32 will pull the toggle-arm 26 from the position shown in Fig. 2 past the dead-center line and that the spring 28 will thereupon shift the stream-deflector to the position shown in Fig. 7.

As all of the members of the several toggle-joints are freely supported on the several partitions of the load-receiver and are connected by springs, it will be apparent that suitable stops for limiting the movement of the toggle-arms in their different positions constitute a very essential feature of the construction and that the toggle members would not operate without them. Hence I have illustrated for each toggle-joint two sets of stops so positioned that corresponding stops of each set will limit the extreme movements of the toggle-arm controlled thereby.

For governing the movements of the toggle members 25 and 26 I have illustrated two pairs of stops, such as 35 and 36 and 37 and 38. When the toggle is in the position shown in Fig. 2, the toggle-arm 25 will be held against the stop 35, while the link 26 will abut against the stop 36. If now the solenoid $e$ is energized and the link 26 oscillated and carried past the dead-center position, during such movement the toggle-arm 25 will of course remain immovable until the dead-center line is passed, whereupon the spring will shift both members of the toggle, and at the end of the movement the toggle members will be at the opposite side of the dead-center position (in that shown in Fig. 2) and the stream-deflector 20 will have been carried across the path of the flow-stream and engaged at the end of its movement by the stop 37, the movement of the arm 26 being limited in a corresponding manner by the stop 38.

In the construction illustrated herein it will be seen that there is no spring for expelling the core of the solenoid, but that the parts remain in the position shown by the devices $e''$ and $t''$ and $e$ and $t$, Fig. 2, throughout the major part of a complete rotation of the load-receiver. The manner in which the cores of these solenoids are expelled will now be described.

At some suitable point in the rotation of the load-receiver I prefer to support on the framework an actuating device, which may be of any suitable type, but will be preferably a resistance-actuator, so positioned as to coöperate with corresponding parts of all three sets of toggle-joints. In the construction shown this actuating device is in the nature of a fixed cam on the framework, this cam being supported on a suitable upright—as, for instance, that shown at 2″—having a properly-shaped cam-face, such as 40, on the under side of the cam, with which face coöperate pins—such as 41, 41′, and 41″—carried, respectively, by the toggle-arms 26, 26′, and 26″, and on which one end of each respective spring 28 and 28′ or 28″, as the case may be, is supported. The manner in which this pin on each toggle is operated when it comes into contact with the cam-face 40 will be obvious by comparing Figs. 3 and 4.

Figure 8:
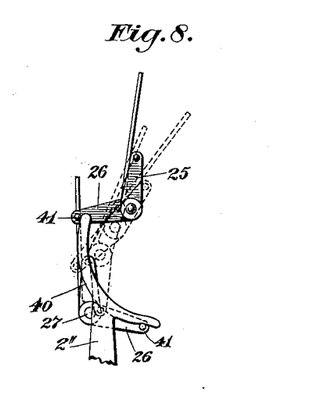
Fig. 8 is a detail illustrating different positions of the stream-deflector and actuating mechanism for shifting the stream, this view showing successive positions of the parts at different points during one partial rotation of the load-receiver.

The several positions of the toggle members during the passage of the pin, such as 41, over the cam-face 40 are illustrated clearly in Fig. 8, from which it will be seen that as the pin goes on to said cam-face the toggle members are in their extreme positions at one side of the dead-center line, while in the second position of the pin the toggle members are nearly straight, but still on the same side of the dead-center position, whereas when the pin reaches the third position (shown in said view) the two toggle-arms are then on the opposite side of said dead-center and in the final position are at the limit of their movements at the opposite side of the dead-center line from that shown in the first position. It will be clear, therefore, that after a stream-deflector is shifted to cut off the flow-stream delivered from the hopper the parts will remain in their shifted position, and such stream-deflector will not return to its original position until its pin, such as 41, shall have passed over the cam-face 40, when, as will be obvious, such stream-deflector will be in position to be shifted again into or across the path of the stream issuing from the chute.

The stream-controlling means or valve mechanism by means of which the flow of material through the hopper H is regulated may be of any suitable type, but will embody, preferably, a valve one of the movements of which will be controlled electrically by automatic electric circuit-controlling means governed by the rotation of the load-receiver. Moreover, said valve mechanism will also include in this instance a pair of oppositely-movable valves, preferably reducing-valves, operative in unison and serving to reduce the main stream to a drip-stream at the proper point in the operation of the weighing mechanism. These valves will also be controlled, preferably, by means of electrically-operated actuators.

In the construction illustrated in these drawings I have illustrated two simultaneously-operative reducing-valves adapted to be closed normally by a suitable counterweight and a cut-off valve normally open and closed by the action of a suitable electrically-operated actuator. The two reducing-valves are indicated by 72 and 72′ and may be supported for operation about a common axis 70, passing through the supply-spout 80, these valves being connected in this case by means of a toggle-joint (indicated by 75) which may be connected with a link, such as 76, pivoted to a counterweight 77, supported on the framework, the opposite end of this lever being connected with the core of a solenoid, such as S, the circuit of which will be hereinafter described. The cut-off valve which I employ may also be an oscillatory one and will preferably have its axis of movement coincident with the axes of the valves 72 and 72′. This coöperative valve is indicated by 72″ and is in the form of a simple pan-valve secured to the outer end of the counterweighted lever 78. The movements of all these valves will of course be limited in one direction by suitable stops. The counterweighted lever 78 is pivotally connected to the core of a solenoid S′, which constitutes the actuator for closing said cut-off valve and shutting off the supply-stream after the valves 72 and 72′ shall have closed.

The circuit by means of which the operation of the reducing-valves is controlled is a simple one and in this case will have therein two breaks controlled, respectively, by the movement of the weighing mechanism and by the action of a suitable regulator, (indicated herein by R.)

From any suitable source of power, such as a battery $b$, a conducting-wire, such as 50, may proceed, which in turn may be connected by means of a conductor 51 with one terminal of the solenoid S, from the other terminal of which a conductor 52 extends to an insulated contact-terminal 53 on the beam mechanism and preferably supported on the counterweight. This contact-terminal coacts with a corresponding contact-point on the framework—such, for example, as the spring-pressed terminal 54'—supported within an insulated casing 54, carried on the arm $2'''$, projecting from the framework. The casing 54 may be connected in turn, by means of a conductor 55, with an insulated contact-strip 56 on the base of the machine, with which contact-strip a switch-arm, such as 57, governed by the regulator, will always be in contact. The free end of this switch-arm is adapted to make contact intermittently with a terminal 58, also insulated from the base of the machine, this contact being connected in turn with a conductor 59, leading to a conductor 60, connected with the return-wire 61 to the battery.

The circuit by means of which the reducing-valves are opened is not a simple one, but is composite and is governed by a plurality of circuit-controllers carried, preferably, by the load-receiver and coöperative with the corresponding contact or contacts on the framework. In this instance I have shown three sets of circuit-controlling strips disposed substantially equidistant from one another on the side wall 12 of the load-receiver, each of these sets having in this instance three preferably parallel strips or contact members. These intermittently-rotating contact-strips will be controlled by corresponding members fixed on the framework, these parts being so disposed relatively to one another as to close or break the circuit to the solenoid S' during a determined period in the rotation of the load-receiver and to open such break during another period in such rotation. In conjunction with these circuit-controllers, which will be described more fully in detail hereinafter, I may also employ other circuit-controlling means, controlled, for example, by the stream-deflector and by the descent of the weighing mechanism to a determined point during the making up of a load. The contacts controlled by the stream-deflectors of course will be three in number, these contacts being arranged in pairs, (designated, respectively, by $c$ $c'$ $c''$.) The contacts of each of these sets are so disposed as to be spanned by the corresponding contact-arm carried by the stream-deflector and hereinbefore described. The two contact members of the set $c$ are indicated by 62 and 63.

The circuit-controlling means governed by the descent of the weighing mechanism and controlling (indirectly) the circuit to the solenoid S' comprises in this case a contact-arm, such as 64, carried by and insulated from the forward end of the beam mechanism, and a coöperating contact, such as 65, on the framework. When the contact between these two members is closed while the load-receiver is stationary and receiving a load, one of the solenoids for actuating a stream-deflector will be operated in a manner which will be described in detail hereinafter and contact thereon made at one of the sets of contact-points $c$ $c'$ $c''$, whereupon the solenoid S' will be energized.

In addition to the contact-arm 64 and its coöperating member 65 for effecting the energization of the solenoid S' and operating the cut-off valve 72' to shut the latter when the load is completed in one compartment of the receiver, I may make use of another contact-arm, such as 66, on the poising side of the beam mechanism and a coöperating contact member, such as 67, on the framework for closing a circuit to holding means normally acting to prevent rotation of the load-receiver, except when a complete load is ready to be discharged.

It should be noted here that the contact will be closed at 64 and 65 to shut off the flow of material entirely before contact is closed at 66 and 67 to release the holding means and permit the rotation of the receiver to discharge the completed load. The reason for this will be obvious.

Coming now to a detailed description of the several contact devices just referred to briefly, the several sets of contact-strips on the wall 12 of the rotary bucket are designated by $s$ $s'$ $s''$. The three strips of the set $s$ are indicated, respectively, by 80, 81, and 82. When the bucket comes to rest in a working position, the contact-strips of one set on the bucket will be in engagement with corresponding contacts on the framework.

Figure 3:
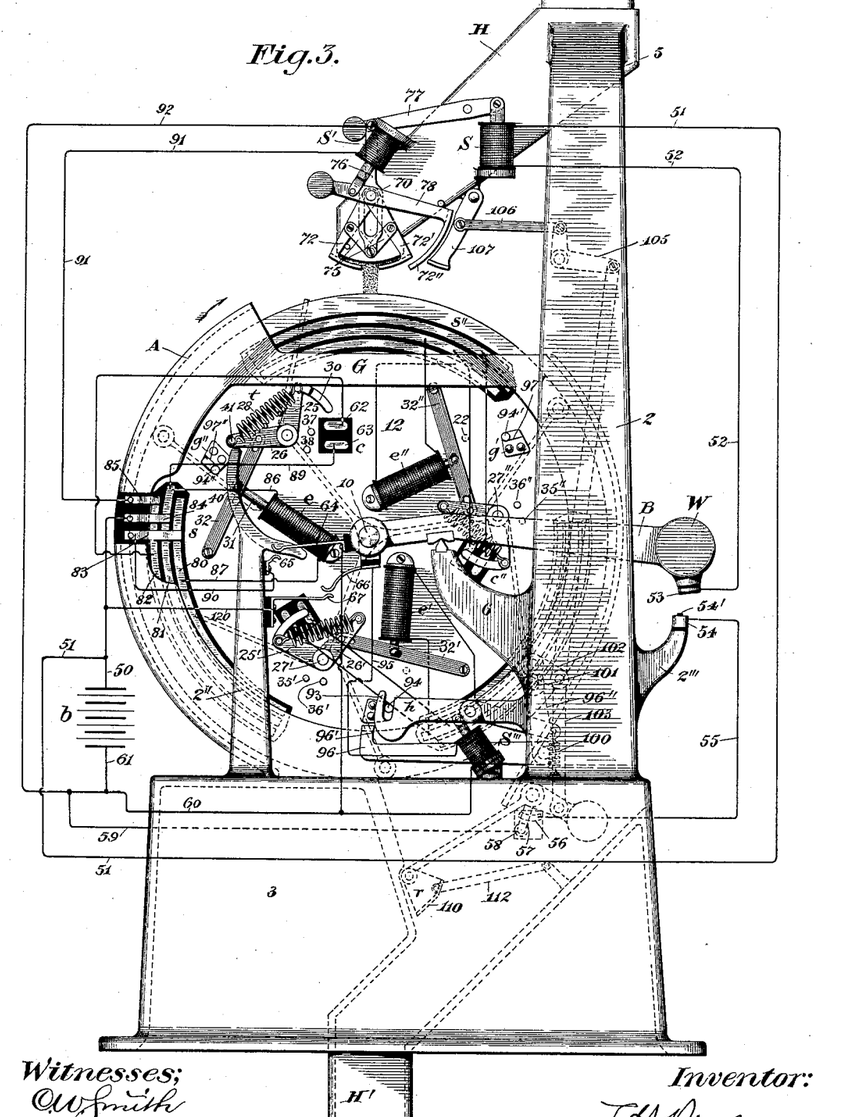
Fig. 3 is a similar view showing the position of the parts during the drip period.
Figure 4:
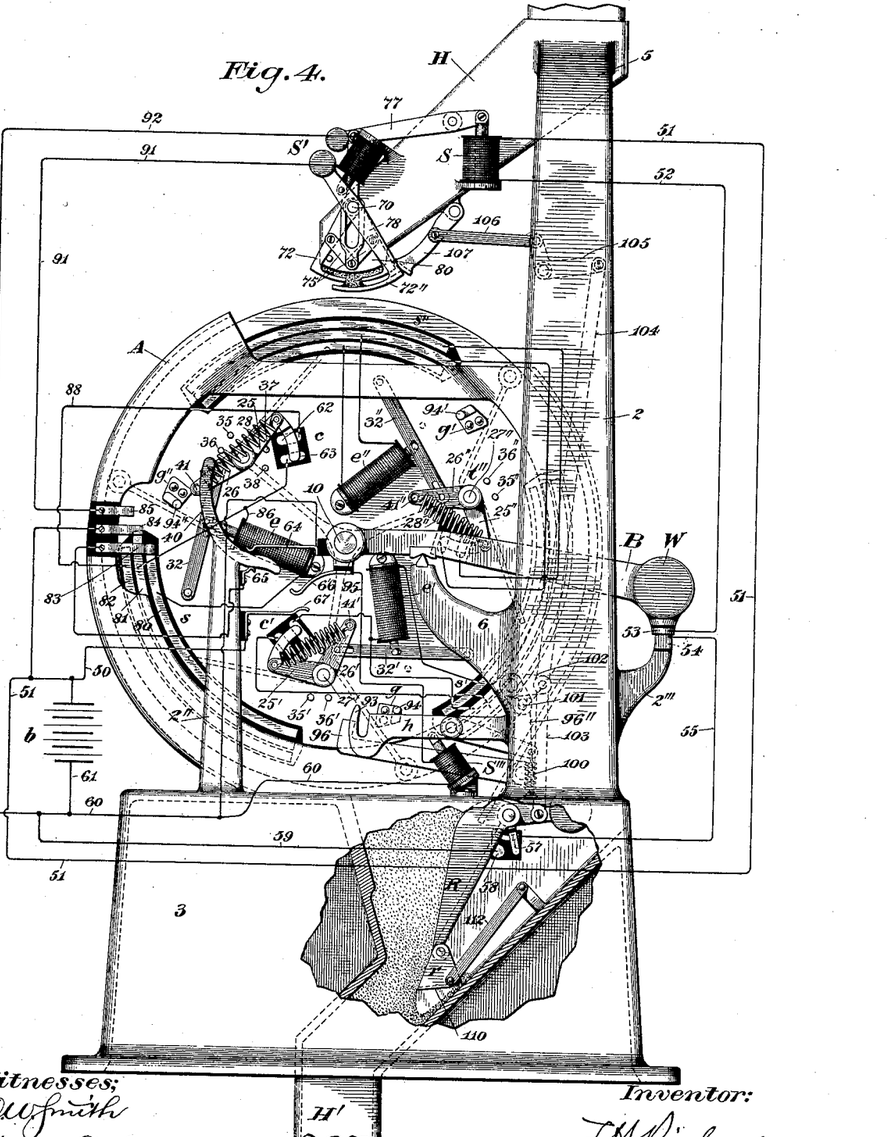
Fig. 4 is a similar view illustrating the positions of the parts on the completion of the load and after the partial rotation of the load-receiver to discharge the completed load.

In Figs. 2 and 3 it will be seen that the contact-strips 80, 81, and 82 are in engagement, respectively, with corresponding contact-strips 83, 84, and 85, supported on a substantially annular member, which annular member is designated in a general way by A and constitutes an inclosing casing for preventing the scattering of material during the loading and discharging operations of the machine. As the particular construction and shape of this casing are immaterial it is believed that a detailed description thereof is unnecessary. Between each solenoid carried by the load-receiver and its coöperative contact-strips is a partial electric circuit, and there is also a like partial circuit between each pair of contacts $c$ $c'$ $c''$ and its coöperating sets of contact-strips. In this case one terminal of the solenoid $e$ is connected by a conductor 86 with the terminal 81, while the other terminal of the solenoid is connected by a conductor 87 with contact-strip 80. The contact 62 is connected in a similar manner, by means of a conductor 88, with the contact-strip 82, while contact 63 is connected by a conductor 89 with the contact-strip 81, to which the conductor 86 is joined. In a similar manner the contact-arm 65 of the upright 2" is connected by means of conductor 90 with a contact-strip 83 on the framework, while the contact-strip 84 is joined to conductor 50, and contact-strip 85 is connected by means of a conductor 91 to one terminal of the solenoid S', the other terminal of said solenoid being connected by a conductor 92 with the return-wire 61 to the battery.

It will be obvious now that when the load-receiver is stationary and in its proper position to be filled by the stream flowing from the supply-spout there will be a contact between the members 83, 84, and 85 and one of the sets of contact-strips on said receiver, and, moreover, that this contact will be maintained during a considerable portion of the partial rotation of the receiver, these contact-strips being made of considerable length for the purpose of preventing premature breaking of the circuit to the solenoid S' and premature opening of the cut-off valve.

For the purpose of stopping the load-receiver at the end of each partial rotation thereof I may employ two separate devices, one of which will constitute the usual holding means or latch, while the other will be in the nature of a blocking device coöperative in this instance with the regulator and also preferably with the cut-off valve. The holding means or latch is in this case in the form of a pivoted or oscillatory hook, such as $h$, supported on the framework near the base of the machine and having near its working end a suitable hook or stop member, such as 93, adapted to engage in one of a series of three stops—such as 94, 94', and 94"—on the side of the bucket. Each of these members is in this case in the form of a pin projecting from the face of a stop-block or segment of suitable size and strength, these three stop-blocks being designated in a general way by $g$, $g'$, and $g''$. The hook $h$ is intended to be electrically operated, as before stated, and in this instance is connected to the core of a solenoid S''', one terminal of which is connected to conductor 60, while the other terminal of said solenoid is connected, by means of a conductor 95, with the contact-arm 66, carried by the beam mechanism. The hook or latch $h$ may be held normally in position for engaging one of the three stops of the bucket by means of a spring, such as 100.

The blocking device just mentioned as coöperative with the regulator is in this case in the nature of an angle-lever 96, pivoted on the framework and having a blocking or stop face 96', adapted to engage one or the other of the stop-faces 97, 97', and 97" on the respective blocks or segments $g$, $g'$, and $g''$.

The short arm 96" of the angle-lever 96 may be bifurcated and operated by a pin 101, projecting from one arm of an angle-lever 102 on the framework, the other arm of which may be connected, by a link or rod 103, to the counterweighted side of the usual counterpoised regulator R. That arm of the angle-lever 102 to which said link 103 is connected may also be joined, by means of a connecting-rod 104, to one arm of an angle-lever 105 near the upper part of the framework, the other arm of this last-mentioned lever being connected in turn by means of a link 106 to a blocking-segment or blocking-stop 107, supported, preferably, on the supply-hopper H. This interlocking segment will be of the usual L-shaped type and will coöperate with a corresponding stop-segment at the edge of the cut-off valve 72". The manner in which these parts coact with one another will be apparent.

The regulator apparatus employed herein is of novel construction and embodies the usual counterweighted regulator R, oscillatory in the well-known manner and carrying a contact-arm 57, controlling the circuit to the solenoid S. At the lower or discharge end thereof this main regulator has suspended therefrom an auxiliary regulator in the form of an oscillatory or swinging pan adapted to dip into the material discharged from a compartment of the bucket and to hold a portion of such material on a stream-supporting face, such as 110. This auxiliary regulator is designated by $r$, and when in its regulating position the face 110 is substantially horizontal; but when the regulator apparatus returns to its normal position said auxiliary regulator is intended to tip and discharge the last portion of the load therefrom, this tipping movement being effected by suitable actuating means, such as a link or rod 112, pivoted to the framework and to the auxiliary regulator. The material discharged through the regulator apparatus flows out over the base through any suitable discharge-conduit, such as H'.

The operation of a weighing-machine constructed in accordance with my present improvements, as illustrated in the drawings of this application, is as follows: It being understood that all of the parts are in their normal positions (shown in Fig. 2) for making up a load in the chamber C, it will be seen that the valves are wide open, the load-receiver latched against movement by the hook $h$, and the regulator is up. Moreover, contact is made at this time at the breaks spanned, respectively, by the switch-arm 57 on the regulator and the contacts 53 and 54', while the contact-strips of the circuit-terminal $s$ are in engagement with the coöperating contact-arms on the framework. The flow-stream will be delivered into the chamber C until the load-receiver begins to descend, whereupon contact will be broken at 53 and 54', solenoid S de-energized, and the two reducing-valves 72 and 72' will close to the position shown in Fig. 3, thereby reducing the flow-stream to a drip-stream. As the stream continues to flow into the chamber C the bucket will continue to descend, and when it reaches substantially the cut-off position contact will be made by the contact-arm 64 with the arm 65, whereupon a circuit will be closed from the battery $b$, through conductor 50, contact-arm 84, contact-strip 81, contact 86, solenoid $e$, conductor 87, contact-strip 80, contact-arm 83, conductor 90, contact-terminal 65, switch-arm 64, conductor 115, conductor 60, and return-conductor 61, back to the battery. The closing of this circuit causes the energization of the solenoid $e$, and consequently the shifting of the toggle $t$ from the position shown in Fig. 2 to the opposite position to oscillate the stream-deflector 20 to the position indicated in Fig. 7 and cut off the flow of material to the chamber C in the manner before described. The last portion of the flow-stream which is in the air at the moment of cut-off is thus diverted into the chamber C' and becomes a part of the next succeeding load. Immediately on the shifting of the stream-deflector 20 the switch-arm 30, carried thereby, closes a circuit at the contacts indicated by $c$, this circuit being from the battery, through conductor 50, contact-arm 84, contact 81, conductor 89, contact $c$, switch-arm 30, contact 62, conductor 88, contact-strip 82, contact-arm 85, conductor 91, solenoid S', conductor 92, and return-conductor 61. The closing of this circuit causes the energization of the solenoid S' and the closing of the cut-off valve 72''. (See Fig. 4.) As soon as the cut-off valve is closed by the closing of the breaks at 64 65 and 62 63 the contact-arm 66 on the continuation of the descent of the bucket engages the arm 67, thus closing a circuit from the battery through conductor 50, conductor 120, contact-arm 67, switch-arm 66, conductor 95, solenoid S''', conductor 60, and return-conductor 61, thus energizing the solenoid S''' and withdrawing the hook $h$ from the stops 94. On the unlatching of the bucket the weight of the load will of course cause the partial rotation of the same to discharge the completed load and bring the chamber C' into position under the supply-spout. The discharged material flowing out from the regulator apparatus carries the main and auxiliary regulators to the positions shown in Fig. 4, and thereupon the contact at 57 58 is broken. As soon as a sufficient portion of the load is discharged the bucket of course will rise, but no circuit will be completed to the valve mechanism, owing to the break just mentioned and to the break in the circuit to the cut-off valve at the contact-arms 64 65. As soon as the load-receiver rises, contact being broken at 66 67, the solenoid S''' is deënergized and the hook $h$ returns to its normal position for intercepting the rotation of the receiver. Moreover, while the regulator apparatus is in the position shown in Fig. 4, the interlocking angle-lever 96 will be maintained in position to engage the next stop-face 94' on the bucket, the hook $h$ of course engaging the stop-pin 94 when the bucket reaches its limit of partial rotation. By this movement of the regulator the interlocking-stop 107 is also thrown into position to prevent the opening of the cut-off valve. On the completion of the discharge of the load the regulator will return to its normal position, restoring the contact 57 58 and emptying the last part of the load from the secondary regulator $r$. The making of the contact, as just stated, causes the closure of a circuit from the battery through conductor 50, conductor 51, solenoid S, conductor 52, contacts 53, 54', and 54, conductor 55, contacts 56, 57, and 58, conductor 59, conductor 92, and return-conductor 61, the energization of the solenoid S causing the opening of the valves 72 and 72'. On the return of the regulator apparatus the interlocking stops 96 and 107 are also withdrawn, as represented, the counterweight of the cut-off valve becoming effective to open the latter to permit the making up of a new load in the next compartment C' of the load-receiver.

The manner in which contact is broken and made with the other sets of contact-strips on the load-receiver during the rotation of the latter will be obvious, and the operation of the actuating means for the stream-deflector to return the latter to its normal position has been before described.

Having described my invention, I claim—

1. In a weighing-machine, a rotary load-receiver having a series of fixed partitions provided at their outer ends with shiftable members facing outward, and a series of shiftable partitions jointed to the load-receiver near the outer end thereof and facing inward and alternating with the said shiftable members.

2. In a weighing-machine, a rotary multichamber load-receiver having a pair of separately-shiftable partitions between adjacent chambers.

3. In a weighing-machine, a rotary multichamber load-receiver having a pair of separately-oscillatory partitions between adjacent chambers.

4. In a weighing-machine, a rotary multichamber load-receiver having a pair of separately-shiftable partitions between adjacent chambers and facing in different directions.

5. In a weighing-machine, a rotary multichamber load-receiver having a pair of separately-shiftable partitions between adjacent chambers, one facing toward the periphery, and the other toward the axis, of the load-receiver.

6. In a weighing-machine, a rotary multichamber load-receiver having a fixed partition between adjacent chambers, an outwardly-facing oscillatory partition carried by said fixed partition, and an inwardly-facing oscillatory partition coöperative with said fixed partition.

7. In a weighing-machine, a rotary multichamber load-receiver having shiftable partitions at opposite sides of each chamber, one of such partitions being gravitative, and stops for limiting the movements of the gravitative partitions.

8. In a weighing-machine, a rotary multichamber load-receiver having a gravitative partition at one side thereof; a spring-actuated partition at the other side thereof; and stops for limiting the movements of said partitions.

9. In a weighing-machine, the combination, with stream-supplying means and with stream-controlling means, of an intermittently-rotative multichamber load-receiver having a shiftable stream-deflector coöperative with the stream-controlling means.

10. In a weighing-machine, the combination, with stream-supplying means and with stream-controlling means, of an intermittently-rotative multichamber load-receiver having a circuit of shiftable stream-deflectors, one for each chamber of the receiver, and coöperative successively with the stream-controlling means.

11. In a weighing-machine, the combination, with stream-supplying means, and with stream-controlling means, of an intermittently-rotative multichamber load-receiver having a shiftable stream-deflecting partition between adjacent chambers and coöperative with the stream-controlling means.

12. In a weighing-machine, the combination, with stream-supplying means and with stream-controlling means, of an intermittently-rotative multichamber load-receiver having a shiftable stream-deflector coöperative with the stream-controlling means, and actuating means for shifting said stream-deflector at a determined point in the movement of the load-receiver.

13. In a weighing-machine, the combination, with stream-supplying means and with stream-controlling means, of an intermittently-rotative multichamber load-receiver having a shiftable stream-deflector coöperative with the stream-controlling means, and actuating means for shifting said stream-deflector in opposite directions at different points in the movements of the load-receiver.

14. In a weighing-machine, the combination, with stream-supplying means and with stream-controlling means, of an intermittently-rotative multichamber load-receiver having a shiftable stream-deflector coöperative with the stream-controlling means and normally out of the path of the flow-stream, and actuating means for shifting said stream-deflector into the path of the flow-stream on the completion of a load.

15. In a weighing-machine, the combination, with stream-supplying means and with stream-controlling means, of an intermittently-rotative multichamber load-receiver having a circuit of shiftable stream-deflectors, one for each chamber of the load-receiver, and coöperative successively with the stream-controlling means, and actuating means for shifting said stream-deflectors successively at a common point in the movement of the load-receiver.

16. In a weighing-machine, the combination, with stream-supplying means and with stream-controlling means, of an intermittently-rotative multichamber load-receiver having a shiftable stream-deflector, and actuating means for shifting said stream-deflector during the descent of the load-receiver and in the opposite direction during the rotation of the load-receiver.

17. In a weighing-machine, the combination, with stream-supplying means and with stream-controlling means, of an intermittently-rotative multichamber load-receiver having a shiftable stream-deflector; a toggle-joint for operating the stream-deflector; and means for straightening and striking said toggle.

18. In a weighing-machine, the combination, with stream-supplying means, and with stream-controlling means, of an intermittently-rotative multichamber load-receiver having a shiftable stream-deflector; a toggle-joint for operating the stream-deflector; and a pair of actuators separately operative for shifting said toggle to opposite sides, respectively, of a dead-center position.

19. In a weighing-machine, the combination, with stream-supplying means and with stream-controlling means, of an intermittently-rotative multichamber load-receiver having a shiftable stream-deflector; a toggle-joint for operating the stream-deflector; a spring connecting the ends of the toggle-arms; and means for straightening said toggle.

20. In a weighing-machine, the combination, with stream-supplying means, stream-controlling means, and framework, of an intermittently-rotative multichamber load-receiver having a shiftable stream-deflector; a toggle-joint for operating the stream-deflector; a spring connecting the ends of the toggle-arms; an actuator on the load-receiver, for straightening said toggle in one direction; and a fixed actuator on the framework, for straightening the toggle in the other direction.

21. In a weighing-machine, the combination, with stream-supplying means, stream-controlling means, and framework, of an intermittently-rotative multichamber load-receiver having a shiftable stream-deflector; a toggle-joint for operating the stream-deflector; a spring connecting the ends of the toggle-arms; an actuator on the load-receiver, for straightening said toggle in one direction; and a fixed cam on the framework, for straightening the toggle in the other direction at a determined point in the rotation of the load-receiver.

22. In a weighing-machine, the combination, with stream-supplying means and with a pair of simultaneously-operative oscillatory valves movable in opposite directions, of a toggle pivoted to said valves; weighing mechanism including a load-receiver; an electric circuit; an automatic electrical circuit-controller governed by the weighing mechanism; and an electrically-operated valve-actuating device controlled by said circuit and connected with the toggle at its joint.

23. In a weighing-machine, the combination, with stream-supplying means and with a pair of simultaneously-operative valves movable in opposite directions, of weighing mechanism embodying a load-receiver; an electric circuit; a regulator; a pair of automatic electrical circuit-controllers governed, respectively, by the weighing mechanism and the regulator, and controlling said circuit conjointly; and electrically-operated valve-actuating means controlled by said circuit.

24. In a weighing-machine, the combination, with stream-supplying means and with a stream-controlling valve, of an intermittently-rotative multichamber load-receiver; an electric circuit; a set of circuit-controlling means, one for each chamber of the load-receiver, operative successively for making and breaking said circuit on the rotation of the load-receiver; and electrically-operated valve-actuating means controlled by said circuit.

25. In a weighing-machine, the combination, with stream-supplying means and with an oscillatory stream-controlling valve, of an intermittently-rotative multichamber load-receiver; an electric circuit; a set of circuit-controlling means, one for each chamber of the load-receiver, operative successively for making and breaking said circuit on the rotation of the load-receiver; and electrically-operated valve-actuating means controlled by said circuit.

26. In a weighing-machine, the combination, with stream-supplying means and with a stream-controlling valve, of weighing mechanism embodying an intermittently-rotative load-receiver having a shiftable stream-deflector coöperative with the stream-controlling valve; valve-actuating means; electrically-operated means for actuating the stream-deflector; automatic electrical circuit-controlling means governed by the weighing mechanism and controlling the actuating means for the stream-deflector; and an automatic electrical circuit-controller operative with stream-deflector and controlling the operation of the valve-actuating means.

27. In a weighing-machine, the combination, with stream-supplying means and with a stream-controlling valve, of weighing mechanism embodying an intermittently-rotative multichamber load-receiver having a circuit of shiftable stream-deflectors, one for each chamber of the load-receiver, coöperative successively with the stream-controlling valve; electrically-operated valve-actuating means; electrically-operated means for actuating the stream-deflectors; automatic electrical circuit-controlling means governed by the weighing mechanism and controlling the actuating means for the stream-deflectors; and automatic electrical circuit-controllers operative with the stream-deflectors and controlling successively the operation of the valve-actuating means.

28. In a weighing-machine, the combination, with stream-supplying means and with stream-controlling means, of weighing mechanism embodying a multichamber load-receiver having a shiftable stream-deflector; an electric circuit; an automatic electrical circuit-controller governed by the weighing mechanism; and electrically-operated actuating means in said circuit for shifting said stream-deflector at a determined point in the movement of the load-receiver.

29. In a weighing-machine, the combination, with stream-supplying means and with stream-controlling means, of weighing mechanism embodying an intermittently-rotative multichamber load-receiver having a shiftable stream-deflector; an electric circuit; a pair of automatic electrical circuit-controllers in said circuit and governed, respectively, by the descent of the weighing mechanism and by the rotation of the load-receiver; and electrically-operating actuating means in said circuit for shifting said stream-deflector at a determined point in the movement of the load-receiver.

30. In a weighing-machine, the combination, with stream-supplying means and with stream-controlling means, of weighing mechanism embodying an intermittently-rotative multichamber load-receiver having a circuit of shiftable stream-deflectors, one for each chamber of the load-receiver, coöperative successively with the stream-controlling means; an electric circuit; a plurality of electrically-operated actuators carried by said load-receiver and operative, respectively, for shifting said respective stream-deflectors at predetermined points in the movement of the load-receiver; and a plurality of automatic electrical circuit-controllers governed by the rotation of the load-receiver for making and breaking the circuits of said actuators successively.

31. In a weighing-machine, the combination, with stream-supplying means and with stream-controlling means, of weighing mechanism embodying an intermittently-rotative multichamber load-receiver having a shiftable stream-deflector; holding means for stopping the rotation of the load-receiver; a pair of electric circuits; successively-operative automatic electrical circuit-controllers governing said respective circuits and controlled by the weighing mechanism; and a pair of electrically-operated actuators controlled, respectively, by said respective circuits and one operative for shifting the stream-deflector and the other for releasing the holding means.

32. In a weighing-machine, the combination, with stream-supplying means, and with a stream-controlling valve, of weighing mechanism embodying a load-receiver having a shiftable stream-deflector coöperative with the stream-controlling valve; actuating means for shifting said stream-deflector at a determined point in the movement of the load-receiver; an electric circuit; valve-actuating means controlled by said circuit; and an automatic electrical circuit-controller governed by the movement of the stream-deflector.

33. In a weighing-machine, the combination, with stream-supplying means and with a stream-controlling valve, of weighing mechanism embodying a load-receiver having a shiftable stream-deflector coöperative with the stream-controlling valve; actuating means for shifting said stream-deflector at a determined point in the movement of the load-receiver; an electric circuit; valve-actuating means controlled by said circuit; and an automatic electrical circuit-controller carried by, and movable with, the stream-deflector.

34. In a weighing-machine, the combination, with stream-supplying means and with a stream-controlling valve, of weighing mechanism embodying an intermittently-rotative multichamber load-receiver having a shiftable stream-deflector coöperative with the load-receiver and operative for deflecting the last portion of the flow-stream away from the filled chamber and into the next succeeding empty chamber; actuating means for shifting said stream-deflector on the completion of a load; an electric circuit; valve-actuating means controlled by said circuit; and an automatic electrical circuit-controller governed by the movement of the stream-deflector.

35. In a weighing-machine, the combination, with stream-supplying means and with a stream-controlling valve, of weighing mechanism embodying an intermittently-rotative multichamber load-receiver having a circuit of stream-deflectors, one for each chamber of the load-receiver, coöperative successively with the valve; actuating means for shifting said stream-deflectors successively at a common point in the rotation of the load-receiver; an electric circuit; valve-actuating means controlled by said circuit; and a plurality of successively-effective circuit-controllers governed, respectively, by said respective stream-deflectors.

36. In a weighing-machine, the combination, with stream-supplying means of counterpoised weighing mechanism embodying an intermittently-rotative multichamber load-receiver; a regulator; and interlocking stops between the regulator and the load-receiver for controlling the intermittent movements of the latter and each of said interlocking stops being adapted to block the operation of the other.

37. In a weighing-machine, the combination, with stream-supplying means and with a stream-controlling valve, of weighing mechanism embodying an intermittently-rotative multichamber load-receiver; a regulator; and coöperative interlocking stops for the valve, the regulator, and the load-receiver.

38. In a weighing-machine, the combination, with framework and with weighing mechanism embodying a load-receiver, of a main regulator supported on the framework; and an auxiliary regulator suspended from the discharge end of the main regulator and having a material-supporting face substantially horizontal when in its regulating position.

39. In a weighing-machine, the combination, with framework and with weighing mechanism embodying a load-receiver, of a main regulator supported on the framework; an auxiliary regulator suspended from the discharge end of the main regulator and having a material-supporting face substantially horizontal when in its regulating position; and means for shifting said auxiliary regulator to discharge the contents thereof when the regulator rises.

40. In a weighing-machine, the combination, with framework and with weighing mechanism embodying a load-receiver, of a main regulator supported on the framework; an auxiliary regulator supported from the discharge end of the main regulator and having a material-supporting face substantially horizontal when in its regulating position; and connecting means between the framework and the auxiliary regulator for shifting the latter to discharge the contents thereof when the regulator rises.

FRANCIS H. RICHARDS.

Witnesses:
F. N. CHASE,
JOHN O. SEIFERT.